INVENTORS
MICHAEL A. CARRELL
PAUL C. GOUNDRY
ROBERT C. POST
KENNETH McNEILL

Richards, Harris & Hubbard

ATTORNEY

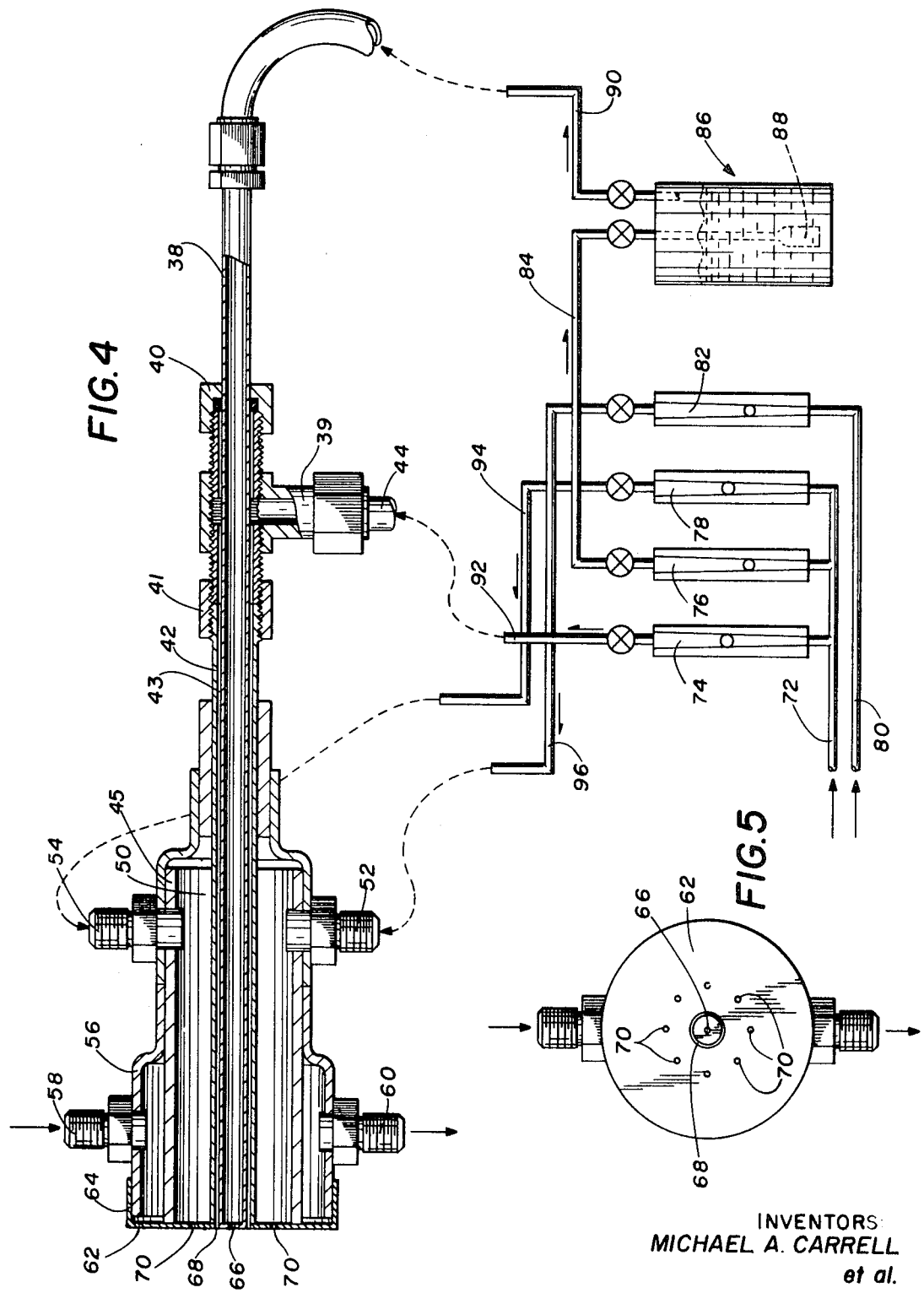

United States Patent Office 3,609,829
Patented Oct. 5, 1971

3,609,829
APPARATUS FOR THE FORMATION OF SILICA ARTICLES
Michael A. Carrell, Plano, Paul C. Goundry, Richardson, and Robert C. Post and Kenneth E. McNeill, Dallas, Tex., assignors to Texas Instruments Incorporated, Dallas, Tex.
Filed July 12, 1968, Ser. No. 744,568
Int. Cl. B29c *13/04*
U.S. Cl. 25—1 R
2 Claims

ABSTRACT OF THE DISCLOSURE

Gaseous streams of silicon tetrachloride and combustible reactants are directed toward a mandrel having an exterior coating of silicon carbide. When the gaseous streams are ignited, the silicon tetrachloride is decomposed and high purity silicon dioxide is deposited upon the silicon carbide surface. After cooling, the silicon dioxide article is easily removed from the silicon carbide surface.

---

This invention relates to the production of an article from powdered metal oxide by the decomposition of volatile metal chlorides, and more particularly to the deposition of metal oxide upon a nonoxidizing, nonadhering and nonreactive surface by the vapor phase hydrolysis of volatile anhydrous chlorides of metallic elements from Groups III and IV of the Periodic System, such as for example, silicon tetrachloride, titanium tetrachloride, and aluminum tetrachloride.

During the fabrication of certain semiconductor devices, it is necessary to "pull" monocrystalline silicon from a melt of very pure silicon. In order to reduce the amount of impurities introduced into the melt of silicon, it has been found advantageous to construct the melt crucible from very pure fused silica. Such fused silica crucibles are required to have very symmetrical configurations and uniform side walls in order to provide a uniform "pull" from the silicon melt contained therein.

Various techniques have been heretofore developed for forming articles from silica. For instance, U.S. Pat. No. 2,272,342, issued Feb. 10, 1942, discloses the production of a transparent article of silica by decomposing vaporized silicon tetrachloride in a flame and depositing the resulting silica upon a refractory core constructed from porcelain. Further, U.S. Pat. No. 3,117,838, issued Jan. 14, 1964, discloses the formation of silica crucible by oxidizing a gas mixture including silane and a reactive gas in a flaming torch and directing the resulting molten silica onto a heated carbon form. Other techniques for forming silica articles have utilized forms or cores made from graphite.

Problems have sometimes heretofore arisen in the formation of silica articles utilizing conventional forms, as the silica article is sometimes difficult to remove from the form on which it is deposited without cracking the surface of the silica article. Further, undesirable surface blemishes and voids have been found in silica articles formed on conventional mold surfaces. With the use of graphite forms, the resulting severe oxidation of the forms has often rendered the forms useless for further deposition cycles. Additionally, the silicon dioxide has tended to deposit into the surface porosity of the graphite and to thus become somewhat bonded to the surface of the graphite. The use of mold forms which have heretofore developed has also sometimes resulted in impurities being introduced into the silica article.

In accordance with the present invention, a form is provided which is shaped to receive the deposition of the oxide of a volatile metal chloride. The form comprises a body having a selected exterior configuration and including a smooth coating of a generally nonporous material thereon. This material is not reactive with the oxide being deposited and the material does not oxidize at the temperatures involved in the deposition process. The material has a different coefficient of thermal expansion than the oxide, and thus when the form and the article are cooled, an automatic release of the article from the form is provided.

In a more specific aspect of the invention, the body is constructed from graphite and a uniform coating of silicon carbide is applied thereto. The body has a mandrel configuration and is rotated relative to a torch flame wherein silicon tetrachloride is being decomposed. Silicon dioxide is thus uniformly deposited upon the coating of silicon carbide to form a hollow article having sufficient "green strength" to be removed from the mandrel for subsequent treatment.

For a more complete understanding of the present invention and for further objects and advantages thereof, reference is now made to the following description taken in conjunction with the accompanying drawings, in which:

FIG. 4 is a partially sectioned view of a suitable torch for applying a layer of silica to the present mandrel; and FIG. 5 is an end view of the torch shown in FIG. 4.

The present invention will be disclosed specifically with respect to the deposition of silicon dioxide by the decomposition of silicon tetrachloride, but it should be understood that other volatile anhydrous chlorides of metallic elements, and their mixtures, from Groups III and IV of the Periodic System could also be advantageously decomposed with the present technique. In the preferred embodiment of the invention, however, silicon tetrachloride is decomposed by vapor phase hydrolysis to form silicon dioxide according to the following equation:

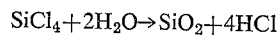

$$SiCl_4 + 2H_2O \rightarrow SiO_2 + 4HCl$$

Figure 1:
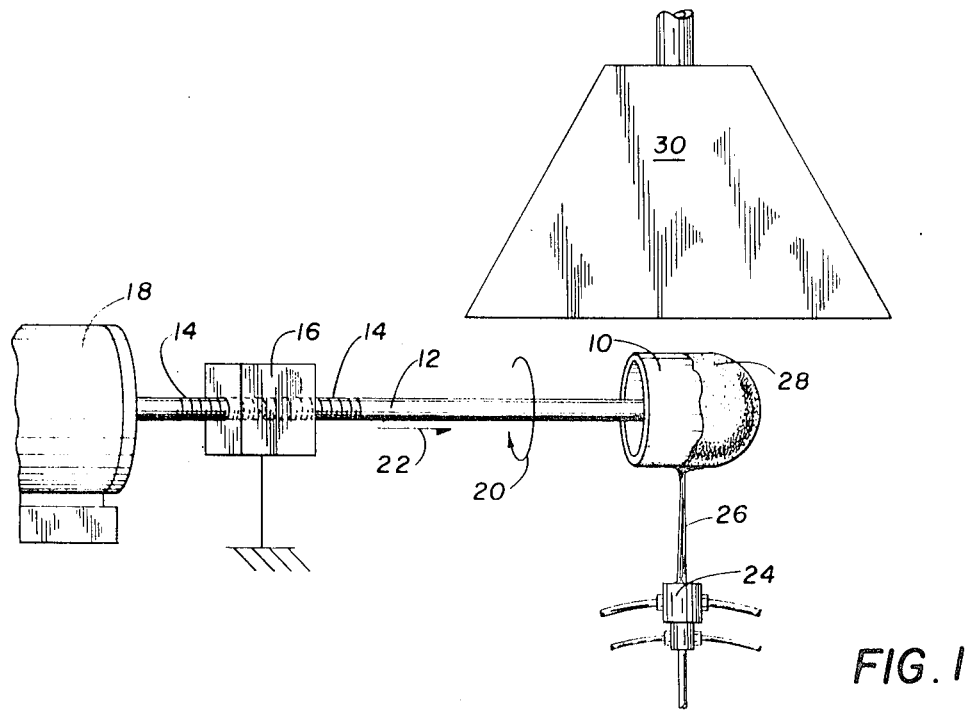
FIG. 1 is a somewhat diagrammatic illustration of a system for applying a silicon dioxide layer to the present mandrel.

Referring to FIG. 1, a system for forming a silica crucible according to the invention is illustrated. A mandrel 10 has a generally circular shape with a rounded closed end portion and with an opposed open end portion. Mandrel 10 is mounted upon a shaft 12 which includes a threaded portion 14. The threaded portion 14 is threadedly received within a member 16 which is rigidly connected to a suitable support structure. The end of the shaft 12 is connected to the output shaft of a motor 18 by an extention member (not shown). The extension member may comprise a keyed sleeve which causes rotation of shaft 12 upon energization of motor 18, but which allows relative movement between the motor shaft and shaft 12 in the direction of the longitudinal axis of shaft 12.

Upon energization of the motor 18, the shaft 12 is rotated in the direction shown by arrow 20. Additionally, rotation of the shaft 12 causes a lateral extension of shaft 12 in the direction of the arrow 22, due to the action of the threaded portion 14 within the stationary member 16. As described previously, the extension member (not shown) between the end of the shaft 12 and the output shaft of the motor 18 enables such lateral translation of the shaft while rotating the shaft.

A torch 24 is mounted adjacent the mandrel 10 to provide a flame 26 which is directed upon the mandrel 10. As will be described in greater detail, the flame 26 results from the combustion of combustible gases. The volatile metal chloride is decomposed by vapor phase hydrolysis by the flame 26, resulting in the deposit of a layer 28 of high purity silicon dioxide upon the exterior surface of the rotating mandrel 10. A vent hood 30 is mounted above the mandrel 10 opposite the torch 24 in order to draw off fumes and undesired components resulting from the flame reaction. If desired, the present deposition process may be carried out in a controlled atmosphere.

Figure 2:
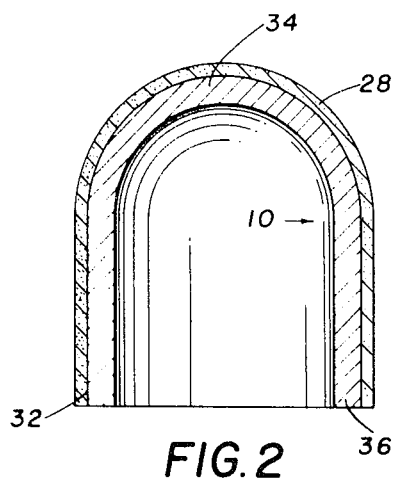
FIG. 2 is a sectional view of the mandrel shown in FIG. 1 after a silicon dioxide coating has been applied thereto.
Figure 3:
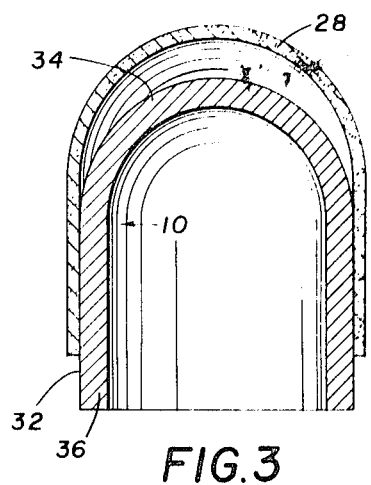
FIG. 3 is a sectional view of the mandrel shown in FIG. 2 with the silicon dioxide article separated therefrom after cooling.

Referring to FIGS. 2 and 3, the mandrel 10 is shown in greater detail, with the silicon dioxide layer 28 formed thereon. Mandrel 10 is preferably constructed from graphite with a thin, uniform coating 32 of silicon carbide deposited thereon. In the preferred embodiment, mandrel 10 is hollow to provide even heat distribution throughout. While mandrel 10 may take on a number of different shapes in order to form different desired shapes of silicon dioxide articles, in the preferred embodiment the mandrel 10 has a closed curved end 34 and an opposed open annular end 36. Mandrel 10 has side walls which are uniform and which have a thickness dependent upon such factors as the relative dimensions of the silicon dioxide crucible to be formed. One practical thickness for the walls of the mandrel 10 has been found to be about one-half inch.

FIG. 2 illustrates the mandrel 10 shortly after the application of the silicon dioxide article 28, and therefore both the mandrel and the article 28 are at elevated temperatures. Specifically, the mandrel 10 is subjetced to temperatures in the range of 1000° C. during the deposition of the silicon dioxide article 28. Both the graphite portion of mandrel 10 and the silicon carbide coating 32 have relatively higher coefficients of thermal expansion than the silicon dioxide particles, and thus upon cooling, the mandrel 10 tends to shrink from engagement with the article 28. As shown in FIG. 3, this results in an automatic release of article 28 from the mandrel 10.

An important aspect of the invention is that the mandrel 10 is shaped so that the article 28 is not impeded from such an automatic release. Thus, it is generally desirable that the shape of the mandrel 10 includes smooth exterior surfaces which are symmetrical and which are either generally parallel to one another or are tapered toward each other. The thickness of the silicon dioxide article 28 is dependent upon the speed of rotation and translation of the mandrel 10 past torch 24. The thickness of the silicon dioxide article 28 may range from a few mils up to several inches, dependent upon the desired use for the article. After removal of the article 28 from mandrel 10, the article 28 is subjected to further treatment to provide a fused silica crucible. During the deposition of the article 28, the silicon dioxide particles are slightly sintered so as to give the article 28 sufficient "green strength" to allow it to be easily handled during further treatment.

The silicon carbide coating 32 is an important aspect of the invention, in that the coating does not oxidize under the high temperatures to which the mandrel is subjected. Further, the silicon carbide coating 32 does not adhere to the silicon dioxide article, and thus does not make the article difficult to remove from the mandrel 10. Further, the silicon carbide coating 32 is not reactive with silicon dioxide, thereby enabling the production of a very high purity article and preventing bonding of the article to the mandrel. Nuclear emission tests and mass spectrographic analysis of silicon dioxide articles formed according to the present invention have confirmed the fact that extremely high purity silicon dioxide articles are formed with the use of the present mandrel.

Although the thickness of the silicon carbide coating 32 may be varied for different uses according to the invention, a thickness of from ten to thirty mils, and preferably twenty mils, has been found to provide excellent results. The exterior surface of the silicon carbide coating is polished in order to provide ready release of the silicon dioxide article, and also to eliminate any residual silicon dioxide powder particles from sticking in the pores of the silicon carbide surface, The silicon carbide coating 32 may be applied to the graphite mandrel by any suitable process. For instance, a suitable process is described in U.S. Pat. application Ser. No. 674,680, entitled "Novel Vapor Deposition Process and Product," filed by William A. Santini, Jr., on Oct. 11, 1967. Additionally, a suitable process for depositing silicon carbide coating on a graphite surface is disclosed in U.S. Pat. No. 3,250,322, issued May 10, 1966.

In such processes, a gaseous stream containing hydrogen, and a gaseous compound which contains silicon and carbon in appropriate ratios, is introduced into a reaction zone in which the heated graphite substrate is located. The carrier gas of the process stream is hydrogen and the flow conditions and geometry of the reaction zone are chosen with reference to the heated graphite substrate such that the process stream flows about the heated substrate to form a minimum thickness quiescent zone through which a relatively high rate of diffusion occurs to produce the rapid codeposition of the silicon and carbon atoms onto the surface of the heated substrate. The proportion of atoms of silicon and carbon that are deposited according to this process can be controlled to yield a material which is substantially stoichiometric silicon carbide or silicon carbide having either carbon or silicon atoms as a second phase. More specifically, methyltrichlorosilane may be used to supply the silicon and carbon atoms in the hydrogen carrier gas and form the process stream, as described in greater detail in the above referenced disclosures.

Other suitable methods of depositing a uniform coating of silicon carbide upon a graphite member may also be advantageously utilized to provide the mandrel of the present invention. The silicon carbide coating utilized with the invention generally has $\beta$ crystalline structures, are very dense, and are essentially fluid-impervious. The silicon carbide coatings may range from stoichiometrically pure silicon carbide to silicon carbide having as much as 0.89% free carbon, or as much as 36.5% free silicon as a second phase element.

A suitable compressive strength of a silicon carbide coating for use with the invention is contained in the range from about $31 \times 10^3$ to about $55 \times 10^3$ p.s.i. A suitable modulus of elasticity of the silicon carbide coating ranges from about $45 \times 10^6$ to about $50 \times 10^6$ p.s.i. Measured coefficients of thermal expansion of the silicon carbide coating when tested in the temperature range of 30° C. to 810° C., ranges from about $4.0 \times 10^{-6}$ to about $5.4 \times 10^{-6}$ in./in./° C. The Knoop hardness of a suitable silicon carbide coating, determined by using a 1000 gram load, ranges from about 2200 to about 2900. The density of the silicon carbide coating determined on a water displacement basis ranges from about 2.59 to 3.28 grams per cc.

An important aspect of the invention is that the graphite body closely matches the coefficient of thermal expansion of the silicon carbide coating, thereby resulting in a mandrel having a long life over widely varying temperature ranges.

Although specific ranges of physical characteristics of suitable silicon carbide coatings have been noted, it should be understood that the invention is not limited to the use of the silicon carbide coating having a specific combination of physical characteristics thus described, and in fact may have certain physical characteristics outside of the ranges noted therein.

FIGS. 4 and 5 illustrate an embodiment of a torch which may be used to deposit high purity silica upon the present mandrel. For further descriptions on the construction and use of a similar torch, reference is made to the copending U.S. patent application Ser. No. 744,188 by Michael A. Carrell, filed July 11, 1968, now Pat. No. 3,565,346. It will be understood that various other types of suitable torches for decomposing a volatile metal chloride could also be used to perform the present invention.

Referring to FIGS. 4 and 5, a stainless steel tube 38 extends through the length of the torch to provide a passage for vaporized silicon tetrachloride entrained in a carrier gas. A T-connection 39 is connected about the tube 38 and is sealed to the tube 38 by member 40. A member 41 fits over a stainless steel tube 42 to provide a seal between the end of tube 42 and the tube 38. A narrow annular sheath chamber 43 is thus defined between the tube 38 and tube 42. An inlet portion 44 of the T-connection 39 is connected to a source of sheath gas, in this instance oxygen containing gas, so that the sheath gas is passed into the sheath chamber 43. One actual embodiment of the invention utilized a one-fourth inch diameter stainless steel tube 38 and a three-eighths inch diameter stainless steel tube 42.

An annular housing 45 defines an annular mixing chamber 50 about tube 42. An inlet fitting 52 is connected to a source of hydrogen while an inlet fitting 54 is connected to a source of oxygen. An annular housing portion 56 defines an annular cooling chamber about the housing 45. An inlet fitting 58 is connected to a source of cooling fluid, such as cool water, and an outlet fitting 60 allows exhausting of the cooling fluid.

A nozzle 62 is fitted over the end of the torch. The nozzle 62 comprises a circular member with a bent annular flange 64 for fluid tight connection to the torch. A central nozzle aperture 66 is provided in the end of tube 38. The end of the tube 38 is received by the nozzle 62 to define an annular sheath opening 68 concentrically disposed relative to the aperture 66. Sheath opening 68 communicates with the sheath chamber 43. Nozzle aperture 66 has a substantially smaller area than the interior area of the tube 38, such that a relatively high velocity jet of gas is provided from the nozzle aperture 66. Gas flowing from the sheath opening 68 substantially envelops the jet of gas from the nozzle aperture 66 to prevent immediate reaction thereof, thereby reducing deposit accumulation on the face of the nozzle member 62 and preventing obstruction thereof.

A plurality of apertures 70 are symmetrically disposed around the nozzle aperture 66 in a cylindrical configuration and communicate with the mixing chamber 50. Combustible gas contained in the mixing chamber 50 flows out of the apertures 70 and reacts with the gas flowing from the aperture 66. In a preferred embodiment of the torch, eight apertures 70 were provided, each having substantially the same area as the nozzle aperture 66. In this practical embodiment of the torch, diameters of .063 inch were found advantageous for aperture 66 and apertures 70. For different operating conditions, greater or larger numbers of apertures 70 may be used.

Oxygen is supplied via a conduit 72 to the inlet of three flowmeters 74, 76 and 78. A suitable source supplies hydrogen through a conduit 80 to a flowmeter 82. Suitable valves are provided on the output of each of the flowmeters in order to allow regulation of the rate of flow of the hydrogen and oxygen to the system. Oxygen is fed from flowmeter 76 via a conduit 84 to a bubbler system designated generally by the numeral 86. Bubbler system 86 comprises a container filled with liquid silicon tetrachloride. A diffusing element 88 bubbles the oxygen upwardly through the silicon tetrachloride, thereby entraining vapors of the silicon tetrachloride in the oxygen and passing outwardly through the conduit 90.

Conduit 90 is connected to the tube 38 to provide a metered stream of vaporized silicon tetrachloride entrained in the oxygen carrier gas. Oxygen is also supplied through the flowmeter 74 via a conduit 92 to the inlet fitting 44 of the T-connection member 39. Oxygen thus flows into the sheath chamber 43 and out the annular aperture 68 in the manner previously described. Oxygen is further supplied via a conduit 94 to the inlet fitting 54 for passage into the mixing chamber 50. Hydrogen is supplied through the flowmeter 82 via a conduit 96 into the inlet fitting 52 for mixing with the oxygen inside the mixing chamber 50. A mixture of combustible gas is then fed outwardly through the apertures 70 in the manner described. Because the hydrogen and oxygen are mixed within the small chamber 50 within the torch, flashback in the present torch is limited to the interior of the torch itself.

In operation of the torch shown in FIGS. 4 and 5, the gaseous streams issuing from the apertures 66, 68 and 70 are ignited to form a hot flame which has temperatures up to 1500° C. The oxygen flowing from the annular opening 68 is relatively inert with respect to the gaseous silicon tetrachloride issuing from the aperture 66, and therefore the silicon tetrachloride is not decomposed immediately adjacent the face of the nozzle 62. This prevents accumulation of deposited obstructions in the apertures of the torch. The gaseous silicon tetrachloride does intermix with the mixture of oxygen and hydrogen issuing from the apertures 70 at a further distance from the nozzle, and hydrolysis occurs in this region. The silicon tetrachloride is thus decomposed to deposit pure silicon dioxide upon the present mandrel.

The following examples will serve to further illustrate the use of the present mandrel, but should not be considered as limiting with respect to the true scope of the invention.

EXAMPLE 1

A graphite cylinder two inches in length with a one inch diameter was uniformly coated with about twenty mils of silicon carbide. The cylinder was rotated at about twenty-four r.p.m. and translated about one inch per minute past a stationary torch constructed generally in accordance with FIGS. 4 and 5. Oxygen was fed to the torch for use as a sheath gas which issued from the annular sheath opening. A supply of oxygen was bubbled through a bubbler which was maintained at about 25° C. to provide gaseous silicon tetrachloride to the torch. Hydrogen and oxygen were fed to the mixing chamber of the torch in order to provide the desired mixture of combustible gases. The mandrel was held about three and one-eighth inches from the nozzle of the torch. The torch was ignited and a layer of silicon dioxide was helically deposited upon the rotating mandrel for one hour. At the end of one hour, a uniform coating of silicon dioxide having a thickness of about one-fourth inch was provided over the mandrel. This silicon dioxide coating was easily removed from the silicon carbide coated mandrel and was found to be essentially free from cracks or blemishes. No oxidation or disintegration of the silicon carbide coating of the mandrel was observed.

EXAMPLE 2

A hollow graphite mandrel having the general shape of the mandrel shown in FIG. 1 was constructed from graphite and was provided with an overall length of about six inches and with a diameter of five inches. The graphite mandrel was coated with a uniform coating of silicon carbide of a thickness of about twenty mils. The mandrel was rotated at about twenty-four r.p.m. and translated laterally at about one inch per minute past a stationary torch constructed similarly to that shown in FIGS. 4 and 5. The mandrel was placed about four inches from the nozzle of the torch and the flame issuing from the torch was impinged upon the silicon carbide coated graphite mandrel for about twenty minutes. Silicon tetrachloride entrained in oxygen was provided to the torch. Oxygen was also fed into the sheath chamber of the torch to provide an output of sheath gas. Hydrogen and oxygen were supplied to the mixing chamber of the torch to provide the combustible mixture to the flame. After twenty minutes of deposition upon the rotating and translating mandrel, the actual deposition of silicon dioxide on the graphite mandrel was about 35.4 grams. The mandrel and the resulting silicon dioxide article were removed from the rotating shaft and allowed to cool. Upon cooling, the silicon dioxide body automatically separated from the mandrel due to shrinkage of the mandrel back to its original size. The resulting silicon dioxide article had sufficient green strength to be removed and subjected to additional treatment.

The present invention thus provides a substrate upon which the oxide of a volatile metal chloride may be advantageously deposited thereon. The present silicon carbide surface provides high oxidation resistance at deposition temperatures in the range of 1000° C. and in the presence of hot gas concentrations. Additionally, the silicon carbide coating is relatively chemically inert with respect to silicon dioxide at the temperatures involved in the deposition process. The present substrate has as mooth finish and allows easy removal of the metal oxide article therefrom. The silicon carbide surface is relatively pure and does not introduce contaminants into high purity metal oxide deposits formed thereon. The present substrate is relatively easy to manufacture in complex and simple configurations.

Whereas the present invention has been described with respect to specific embodiments thereof, it is to be understood that various changes and modifications will be suggested to one skilled in the art, and it is intended to cover such changes and modifications as fall within the true scope of the invention as defined by the appended claims.

What is claimed is:

1. In a system for forming an article from the oxide of a volatile metal chloride, the combination comprising:
   a graphite mandrel having a thin exterior surface of silicon carbide, said mandrel having a generally cylindrical configuration with a rounded closed end, and having a substantially higher coefficient of thermal expansion than said oxide, and
   means for directing gaseous reactant streams toward said mandrel to deposit said oxide on said silicon carbide surface, said means comprising:
   (a) a torch housing including a passage terminating in a nozzle aperture for providing an output jet stream of said volatile metal chloride entrained in a carrier gas,
   (b) means defining a first chamber disposed adjacent said passage within said torch housing for receiving a supply of a combustible gas and including nozzle openings symmetrically disposed to said nozzle aperture for providing a stream of combustile gas about said jet stream, and
   (c) means defining a second chamber disposed between said passage and said first chamber for receiving a supply of gas relatively inert to said volatile metal chloride and including a sheath opening for providing a sheath stream of said inert gas between said jet stream and said stream of combustible gas sufficient when the torch is ignited to prevent residue from being formed on said nozzle aperture while providing efficient disposition of oxide of said volatile metal chloride.

2. The combination of claim 1, wherein said exterior surface of silicon carbide is provided by a coating of 10–30 mils thick.

References Cited

UNITED STATES PATENTS

| | | | |
|---|---|---|---|
| 2,272,342 | 2/1942 | Hyde | 65—22 X |
| 3,339,616 | 9/1967 | Ward | 239—132.3 |
| 3,385,723 | 5/1968 | Pickar | 264—29 X |
| 3,387,784 | 6/1968 | Ward | 239—132.3 |
| 3,393,084 | 7/1968 | Hartwig | 264—29 |
| 3,410,746 | 11/1968 | Turkat | 264—29 X |
| 3,429,962 | 2/1969 | Krystyniak | 264—81 |
| 3,445,554 | 5/1969 | Jerome | 264—82 X |
| 3,484,044 | 12/1969 | Dombruch | 239—422 |
| 3,486,870 | 12/1969 | Vervaart | 264—82 |

FOREIGN PATENTS

| | | | |
|---|---|---|---|
| 1,249,283 | 11/1960 | France | 239—132.3 |

J. SPENCER OVERHOLSER, Primary Examiner

B. D. TOBOR, Assistant Examiner

U.S. Cl. X.R.

239—422; 249—115; 264—81